(12) United States Patent
Lee et al.

(10) Patent No.: US 7,836,703 B2
(45) Date of Patent: Nov. 23, 2010

(54) RECIPROCAL COOLED TURBINE NOZZLE

(75) Inventors: Ching-Pang Lee, Cincinnati, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 825 days.

(21) Appl. No.: 11/765,522

(22) Filed: Jun. 20, 2007

(65) Prior Publication Data

US 2008/0317585 A1 Dec. 25, 2008

(51) Int. Cl.
*F02C 7/12* (2006.01)
(52) U.S. Cl. .................................. 60/806; 415/115
(58) Field of Classification Search ................ 415/115; 60/805, 806
See application file for complete search history.

(56) References Cited

U.S. PATENT DOCUMENTS

| | | | |
|---|---|---|---|
| 3,475,107 A | 10/1969 | Auxier | |
| 5,169,288 A | 12/1992 | Gliebe et al. | |
| 5,758,416 A * | 6/1998 | Reverman et al. | 29/889.1 |
| 5,813,832 A * | 9/1998 | Rasch et al. | 415/200 |
| 5,997,245 A | 12/1999 | Tomita et al. | |
| 6,077,036 A | 6/2000 | Heffron et al. | |
| 6,099,245 A * | 8/2000 | Bunker | 415/115 |
| 6,183,192 B1 | 2/2001 | Tressler et al. | |
| 6,270,317 B1 | 8/2001 | Manning et al. | |
| 6,283,708 B1 * | 9/2001 | Zelesky | 416/97 R |
| 6,345,955 B1 * | 2/2002 | Heffron et al. | 415/115 |
| 6,354,797 B1 * | 3/2002 | Heyward et al. | 415/191 |
| 6,402,458 B1 | 6/2002 | Turner | |
| 6,422,819 B1 * | 7/2002 | Tsai et al. | 416/97 R |
| 6,428,273 B1 * | 8/2002 | Keith et al. | 416/97 R |
| 6,554,562 B2 | 4/2003 | Dudebout et al. | |
| 6,609,880 B2 | 8/2003 | Powis et al. | |
| 6,652,220 B2 | 11/2003 | Tressler et al. | |
| 6,773,230 B2 * | 8/2004 | Bather et al. | 416/97 R |
| 6,783,323 B2 | 8/2004 | Shiozaki et al. | |
| 6,832,889 B1 * | 12/2004 | Lee et al. | 415/115 |
| 6,929,446 B2 * | 8/2005 | Lu et al. | 415/115 |
| 7,008,178 B2 | 3/2006 | Busch et al. | |
| 7,094,027 B2 | 8/2006 | Turner et al. | |
| 7,147,432 B2 * | 12/2006 | Lowe et al. | 415/116 |
| 7,195,454 B2 * | 3/2007 | Lu et al. | 415/181 |
| 7,217,081 B2 * | 5/2007 | Scheurlen et al. | 415/1 |
| 7,217,096 B2 * | 5/2007 | Lee | 416/97 R |
| 7,296,973 B2 * | 11/2007 | Lee et al. | 416/97 R |
| 7,322,797 B2 * | 1/2008 | Lee et al. | 416/193 A |
| 7,377,743 B2 | 5/2008 | Flodman et al. | |
| 2008/0145210 A1 * | 6/2008 | Lee et al. | 415/176 |

OTHER PUBLICATIONS

U.S. Appl. No. 11/311,104 filed Dec. 19, 2005, Flodman.

* cited by examiner

*Primary Examiner*—William H Rodriguez
(74) *Attorney, Agent, or Firm*—William S. Andes; Francis L. Conte

(57) ABSTRACT

A turbine nozzle includes first and second vanes joined to outer and inner bands. The vanes include outboard sides defining outboard flow passages containing axial splitlines, and opposite inboard sides defining an inboard flow passage without axial splitline. The two vanes include different cooling circuits for differently cooling the inboard and outboard vane sides.

36 Claims, 4 Drawing Sheets

RECIPROCAL COOLED TURBINE NOZZLE

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in a high pressure turbine (HPT) which powers the compressor.

And, additional energy is extracted in a low pressure turbine (LPT) which drives an upstream fan in an aircraft turbofan aircraft engine application, or drives an external drive shaft in marine and industrial applications.

The modern combustor is annular and includes radially outer and inner combustion liners extending downstream from a forward dome to define an annular combustion zone. A row of fuel injectors and cooperating air swirl cups are mounted in the dome for discharging air atomized fuel jets that are suitably ignited for generating the combustion gases.

The fuel injectors are spaced circumferentially apart from each other typically in a uniform distribution, and correspondingly effect relatively hot streaks of combustion gases which flow downstream to the annular combustor outlet.

The maximum combustion gas temperature is found along the center of each hot streak, and the combustion gas temperature correspondingly decreases radially outwardly from the centerline of each hot streak, which is both radially between the outer and inner combustor liners, as well as circumferentially around the combustor between the circumferentially spaced apart hot streaks.

The resulting temperature pattern of the combustion gases at the annular combustor outlet varies both radially between the outer and inner liners, and circumferentially between the hot streaks, with the lower temperature gases between the hot streaks typically being referred to as cold streaks. The differential temperature between the hot and cold streaks may be several hundreds of degrees and affects performance and operation of the downstream turbine components.

More specifically, the combustion gases discharged from the combustor outlet are first received by the first stage HPT turbine nozzle which guides the gases to the following first stage row of turbine rotor blades mounted on the perimeter of a supporting rotor disk. The turbine nozzle includes a row of hollow nozzle vanes mounted radially between corresponding outer and inner bands.

The nozzle is typically segmented circumferentially in a common configuration of nozzle doublets having two vanes integrally mounted in corresponding outer and inner band segments.

The annular nozzle is therefore circumferentially divided by axial splitlines in corresponding end faces of the outer and inner bands of the nozzle doublets. And, the end faces typically include slots for mounting spline seals therein for maintaining the circumferential continuity of the turbine nozzle and sealing internal cooling air loss therefrom.

The number of nozzle vanes in the complete row is substantially greater than the number of fuel injectors in the combustor and is commonly not an integer multiple thereof. Accordingly, in the assembly of the combustor relative to the turbine nozzle, the fuel injectors vary in relative circumferential position with the leading edges of the row of nozzle vanes.

The hot streaks generated from the fuel injectors during operation are therefore circumferentially aligned or clocked differently or randomly from vane to vane, and therefore subject the vanes to different heat loads during operation. The hot streaks bathe the nozzle vanes in maximum temperature combustion gases, whereas the circumferentially intervening cold streaks bathe the vanes in relatively cooler combustion gases.

Accordingly, the turbine nozzle is commonly designed with circumferential uniformity having substantially identical nozzle vanes and band segments, in the typical doublet configuration for example. An even number of nozzle vanes is therefore found in the doublet nozzle configuration with two identical vanes in each doublet.

The nozzle vanes have the typical crescent profile with generally concave pressure sides and generally convex suction sides extending axially in chord between opposite leading and trailing edges. The vanes in each doublet define an inboard flow passage therebetween, with the vanes between doublets defining outboard flow passages which include the respective axial splitlines.

The inboard and outboard nozzle passages converge in the downstream direction to a minimum flow area typically defined at the trailing edge of one vane normal to the suction side of the adjacent vane.

The combustion gases are typically discharged at an oblique circumferential angle into the downstream row of turbine rotor blades which rotate the supporting rotor disk in the direction of the blade suction sides relative to the blade pressure sides.

Each nozzle doublet therefore includes a lead vane over which the turbine blades first pass, and a trail vane over which the turbine blades secondly pass during rotation.

The cold and hot streaks from the combustor are channeled axially through the flow passages of the turbine nozzle and therefore similarly bathe the turbine rotor blades in the alternating hot and cold streaks which also affects their performance during operation.

Accordingly, the nozzle stator vanes and turbine rotor blades are typically identical in each row thereof and typically include identical cooling circuits therein for their different environments. Both vanes and blades use a portion of pressurized air bled from the compressor for cooling the corresponding airfoils thereof for achieving the desired useful life of the engine during operation.

Since the air bled from the compressor is not used in the combustor, the overall efficiency of the engine is decreased. The amount of cooling air bled from the compressor should therefore be minimized for maximizing engine efficiency.

However, the vanes and blades must be designed in conventional practice for identical cooling thereof in each row for protecting the airfoils from the maximum temperatures and heat loads from the hot streaks produced by the combustor notwithstanding the significantly lower temperature of the cold streaks alternating with the hot streaks during operation.

Accordingly, it is desired to provide an improved turbine nozzle which preferentially accommodates the hot and cold streaks in the combustion gases for improving performance of the gas turbine engine.

BRIEF DESCRIPTION OF THE INVENTION

A turbine nozzle includes first and second vanes joined to outer and inner bands. The vanes include outboard sides defining outboard flow passages containing axial splitlines, and opposite inboard sides defining an inboard flow passage without axial splitline. The two vanes include different cooling circuits for differently cooling the inboard and outboard vane sides.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
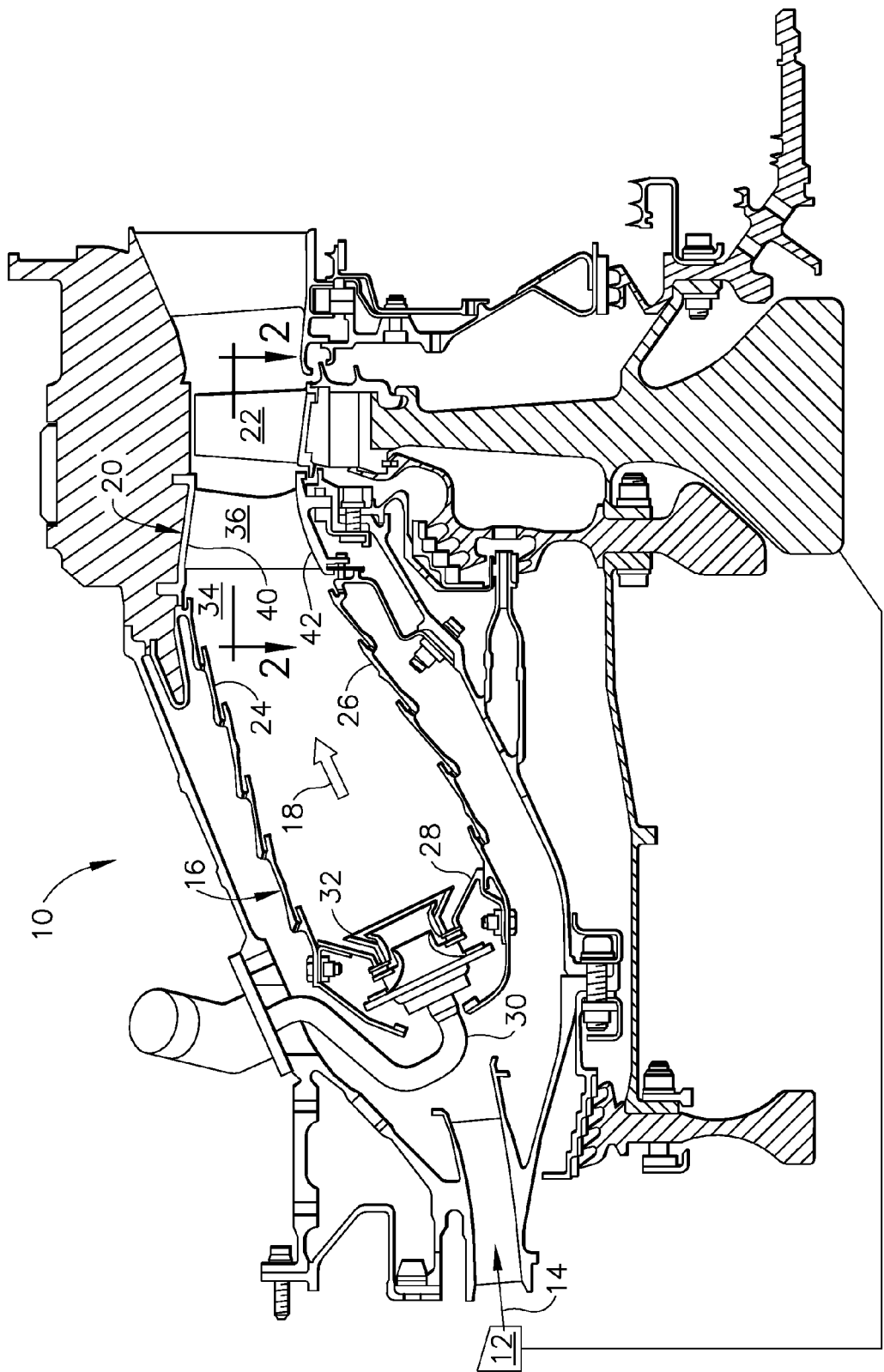
FIG. 1 is an axial sectional view of the turbine portion of a gas turbine engine.

Illustrated in FIG. 1 is a portion of a gas turbine engine 10 which is axisymmetrical about a longitudinal or axial centerline axis. The engine includes a multistage axial compressor 12 for pressurizing air 14.

An annular combustor 16 is mounted downstream from the compressor and mixes the pressurized air 14 with fuel which is ignited for generating hot combustion gases 18.

The combustion gases are discharged from the combustor into an annular first stage turbine nozzle 20 in the HPT which in turn channels the gases into a row of first stage turbine rotor blades 22 directly following the nozzle. The blades are suitably mounted to the perimeter of a supporting rotor disk which in turn is joined to the rotor of the compressor 12 which is powered by the turbine blades during operation.

The LPT is located downstream of the HPT, and is shown in part, and includes additional rotor blades that typically power an upstream fan (not shown) in an aircraft engine configuration of the turbine. In alternate embodiments, the LPT may power an external drive shaft for marine and industrial applications.

The combustor illustrated in FIG. 1 includes a radially outer combustor liner 24 and a coaxial, radially inner combustor liner 26 defining an annular combustion zone therebetween. The liners extend downstream from an annular dome 28 and are suitably mounted inside a surrounding combustor casing.

The combustor dome 28 includes a row of fuel injectors 30 extending through cooperating air swirling cups 32 which provide an atomized mixture of fuel and air inside the combustor which is then suitably ignited for generating the hot combustion gases 18 during operation.

The annular combustor 16 illustrated in FIG. 1 includes an annular outlet 34 at the downstream, aft end thereof through which the hot combustion gases 18 are discharged during operation. The row of fuel injectors 30 is disposed at the upstream or forward dome end of the combustor, with the individual injectors being uniformly spaced apart circumferentially from each other around the dome.

Accordingly, the combustion gases 18 generated in the combustor during operation will experience relatively hot streaks directly axially aft from the individual fuel injectors 30 with correspondingly relatively cooler combustor cold streaks disposed circumferentially therebetween. The hot and cold streaks therefore will flow downstream through the turbine nozzle 20 and then through the first row of turbine rotor blades 22 which extract energy therefrom to rotate the supporting disk and power the compressor.

Figure 2:
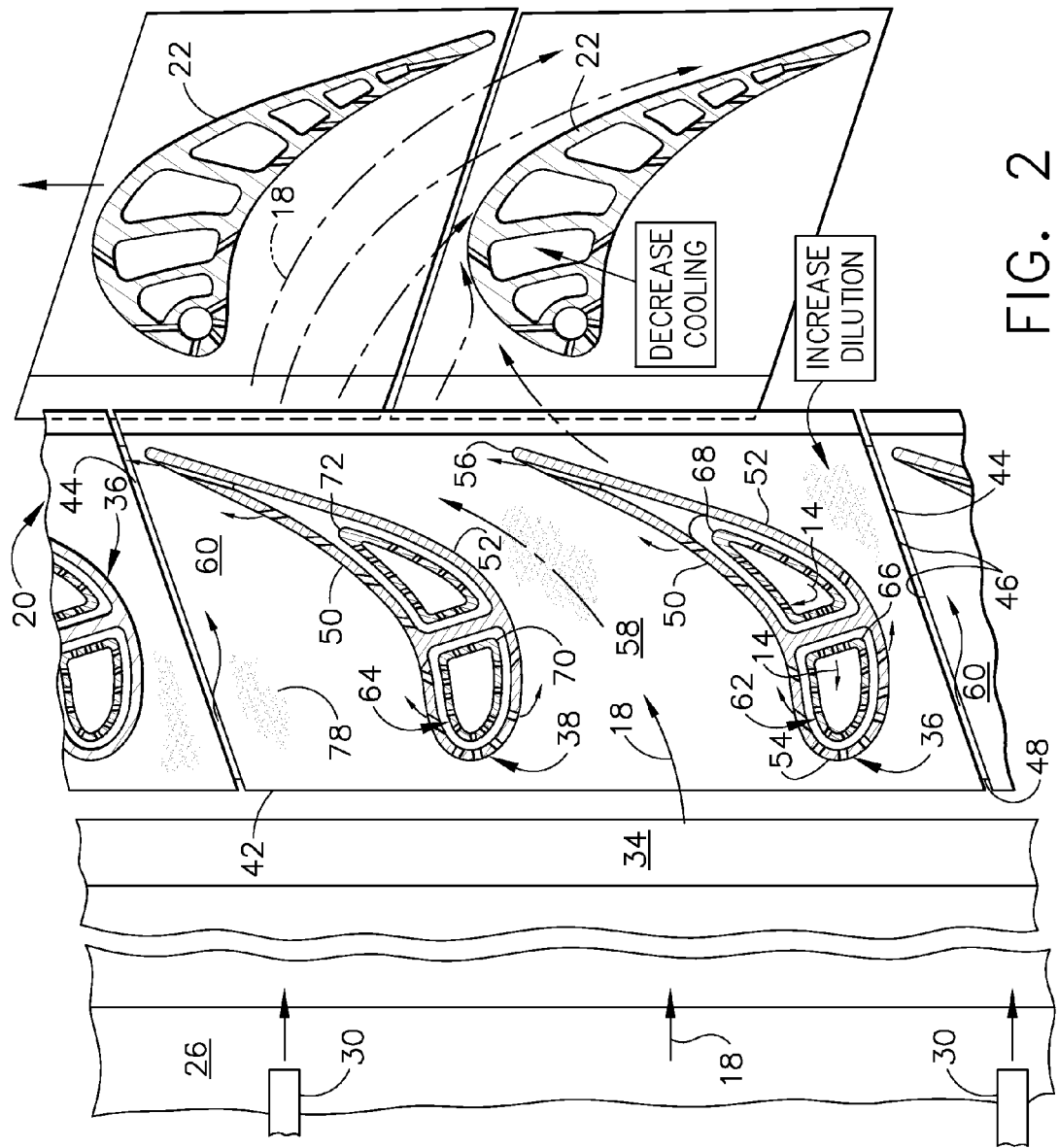
FIG. 2 is a radial sectional, planiform view of the high pressure turbine illustrated in FIG. 1 and taken along line 2-2.
Figure 3:
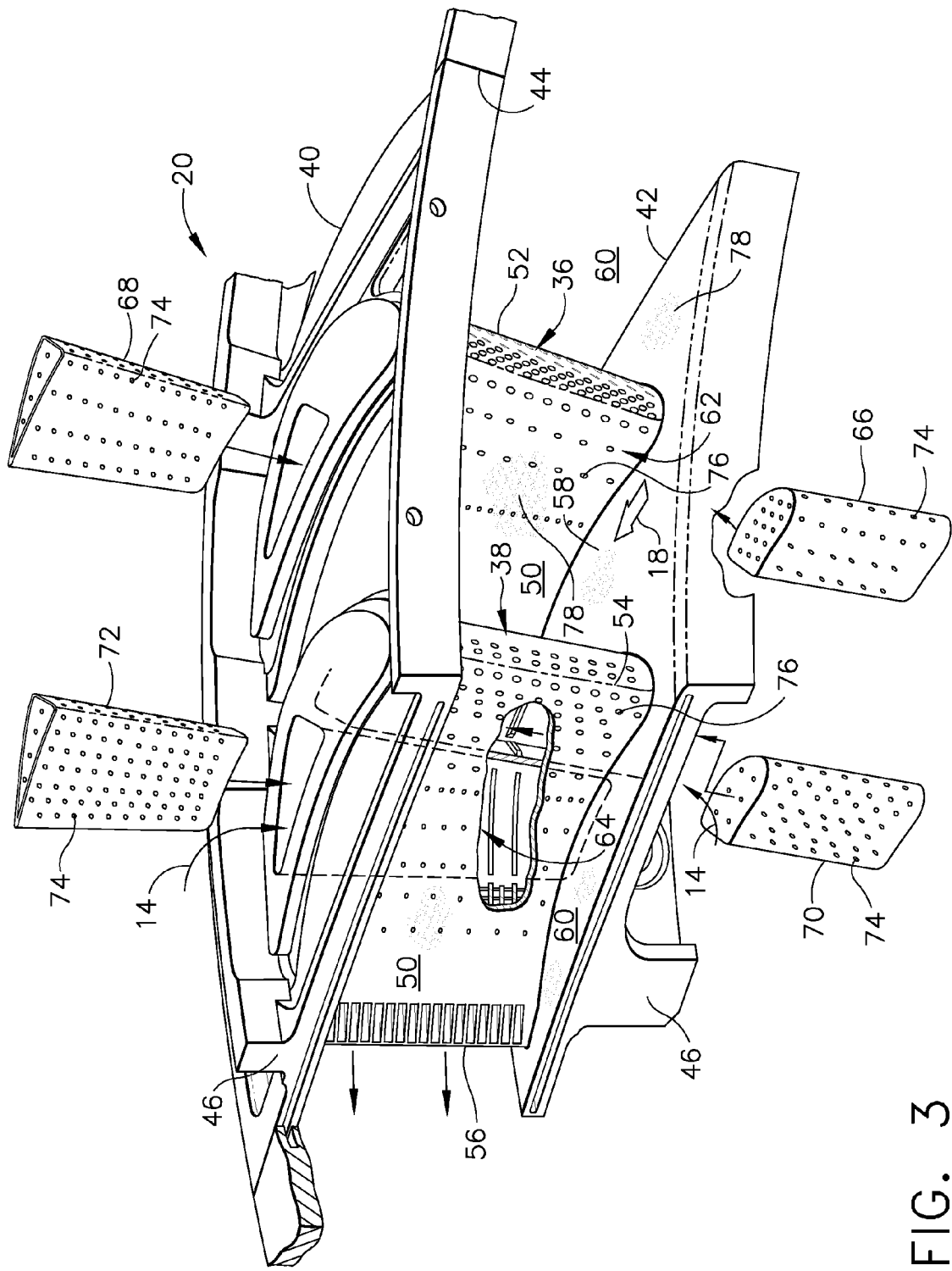
FIG. 3 is an exploded, isometric view of an exemplary nozzle doublet found in the turbine nozzle illustrated in FIGS. 1 and 2.

The annular turbine nozzle 20 initially illustrated in FIG. 1 is shown in more detail in FIGS. 2 and 3 in cooperation with the upstream combustor and downstream turbine blades. The nozzle 20 includes a row of alternating first and second stator vanes 36,38 which are preferably arranged in pairs in nozzle doublets. The two vanes in each doublet extend radially between outer and inner bands 40,42 which are circumferentially arcuate and collectively define the full perimeter of the nozzle.

The two vanes and band segments may be integrally formed in a unitary casting or may be separately manufactured and suitably joined together, by brazing for example, to form a unitary component of the nozzle.

The annular nozzle is segmented circumferentially by corresponding axial splitlines 44 which are defined by corresponding endfaces 46 at the opposite circumferential ends of the outer and inner bands 40,42 in each doublet.

FIG. 3 illustrates two of the endfaces 46 having axial slots therein in which are disposed conventional spline seals 48 illustrated in the assembly of FIG. 2. Accordingly, the full row of nozzle doublets and vanes defines a fully annular turbine nozzle segmented circumferentially in the outer and inner bands by the corresponding splitlines having the spline seals 48 therein for maintaining the circumferential continuity of the nozzle.

The row of alternating first and second vanes 36,38 illustrated in FIG. 2 have identical aerodynamic profiles and define substantially identical flow passages therebetween. For example, each of vanes 36,38 has a generally concave pressure side 50 and a circumferentially opposite, generally convex suction side 52 extending axially in chord between opposite leading and trailing edges 54,56. The opposite sides of each vane extend in span over the radial height of the nozzle between the outer and inner bands 40,42.

Each nozzle doublet illustrated in FIG. 2 includes only the two vanes 36,38 integrally joined with their respective arcuate bands 40,42. The row of turbine blades 22 also illustrated in FIG. 2 rotates during operation with the corresponding convex, suction side thereof leading the opposite concave pressure side thereof.

In this way, the first nozzle vane 36 in each doublet defines the leading or lead vane over which first passes turbine blades during rotation, with the second nozzle vane 38 defining the trail or trailing vane in each nozzle segment.

The pressure side 50 of the first vane 36 directly faces the opposite suction side 52 of the second vane 38 and defines circumferentially therebetween with the bands an inboard flow passage 58 without splitline. The two opposing vane sides defining the inboard passage 58 are also referred to as inboard vane sides accordingly.

Correspondingly, the suction side 52 of the first vane 36 and the pressure side 50 of the second vane 38 face circumferentially outwardly or outboard toward the respective endfaces 46 and axial splitlines 44 of the next adjacent nozzle doublets. In this way, the suction side 52 of the first vane 36 cooperates with the pressure side 50 of the second vane 38 on the next doublet to define with the bands corresponding outboard flow passages 60 between each of the nozzle doublets to include the respective axial splitlines 44 therein.

The suction side 52 of the first vane and the pressure side 50 of the second vane in each doublet therefore define outboard vane sides, and along with the corresponding outer and inner bands define corresponding ones of the outboard flow passages which include the splitlines 44, whereas the inboard flow passages 58 inside each nozzle doublet are devoid of any axial splitline therein.

A significant improvement in performance of the turbine nozzle 20 illustrated in FIG. 2 may be obtained by circumferentially aligning or clocking the individual fuel injectors 30 from the combustor with corresponding ones of the outboard flow passages 60. Correspondingly, none of the fuel injectors 30 is clocked or circumferentially aligned with any of the inboard flow passages 58 in the full row of nozzle doublets.

This clocking configuration between the row of fuel injectors 30, which generate the hot streaks during operation, with the row of nozzle vanes 36,38 permits preferential cooling of the individual vanes with different performance for better utilizing the limited amount of pressurized cooling air bled from the compressor.

More specifically, each of the first and second vanes 36,38 has a respective first and second cooling circuit 62,64 for preferentially cooling the vane sides. The two cooling circuits 62,64 may share common features, but are suitably modified differently for differently cooling the different sides of the different first and second vanes bounding the inboard flow passages therebetween without the axial splitlines than the outboard vane sides bounding the outboard flow passages 60 between nozzle segments which contain the axial splitlines 44.

More specifically, the different first and second cooling circuits 62,64 are preferentially configured to effect reciprocal cooling on the outboard sides 50,52 of the vanes 36,38 than on the inboard sides 50,52 of the same vanes.

To improve the cooperation with the hot and cold streaks from the combustor, the first and second cooling circuits 62,64 are preferentially configured to effect more cooling along the outboard sides of the nozzle vanes than along the inboard sides thereof for each nozzle segment or doublet. In particular, the first cooling circuit 62 is suitably configured to provide more cooling over the outboard suction side 52 of the first vane 36 adjoining the endface 46 and splitline than the second cooling circuit 64 provides over the inboard suction side 52 of the second vane 38.

Correspondingly, the second cooling circuit 64 is preferentially configured to provide more cooling over the outboard pressure side 50 of the second vane 38 near the corresponding endface 46 and splitline than the first cooling circuit 62 provides over the inboard pressure side 50 of the first vane 36.

As shown in FIG. 2 for example, the first and second circuits 62,64 effect more cooling in the individual vanes 36,38 along the respective outboard sides 50,52 thereof from the leading edge 54 to the trailing edge 56 thereof than along the inboard sides 50,52 thereof between the leading and trailing edges.

The exemplary embodiment of the turbine nozzle illustrated in FIGS. 2 and 3 may otherwise be conventional in configuration and operation except for suitable modification of the different first and second cooling circuits 62,64 corresponding with the leading first vane 36 and trailing second vane 38.

For example, the basic cooling circuits 62,64 include two radial flow passages in the forward and aft parts of each vane separated by an imperforate bridge between the opposite vane sides. Pressurized cooling air 14 is suitably bled from the compressor and channeled through the outer and inner bands inside the two vanes of each doublet.

The first vane 36 may have a first pair of impingement baffles 66,68 disposed in corresponding ones of the forward and aft flow passages. And, the second vane 38 has a corresponding second pair of impingement baffles 70,72 in the forward and aft passages thereof.

The forward impingement baffles 66,70 may be identical to each other, except for flow characteristics. And, the aft baffles 68,72 may also be identical to each other except for flow characteristics thereof. The impingement baffles have corresponding patterns of small impingement holes 74 which may be suitably modified for obtaining the different cooling performance in the first and second vanes 36,38.

Furthermore, each of the first and second vanes 36,38 also includes corresponding patterns of conventional film cooling holes 76 through both sides 50,52 of each vane which may also be used for preferentially modifying the cooling performance of each vane.

Yet further, the exposed surfaces of the outer and inner bands 40,42 and the pressure and suction sides 50,52 of the first and second vanes 36,38 may be covered with conventional thermal barrier coating (TBC) 78, yet again suitably modified for controlling thermal insulation and associated cooling of the vanes 36,38.

Figure 4:
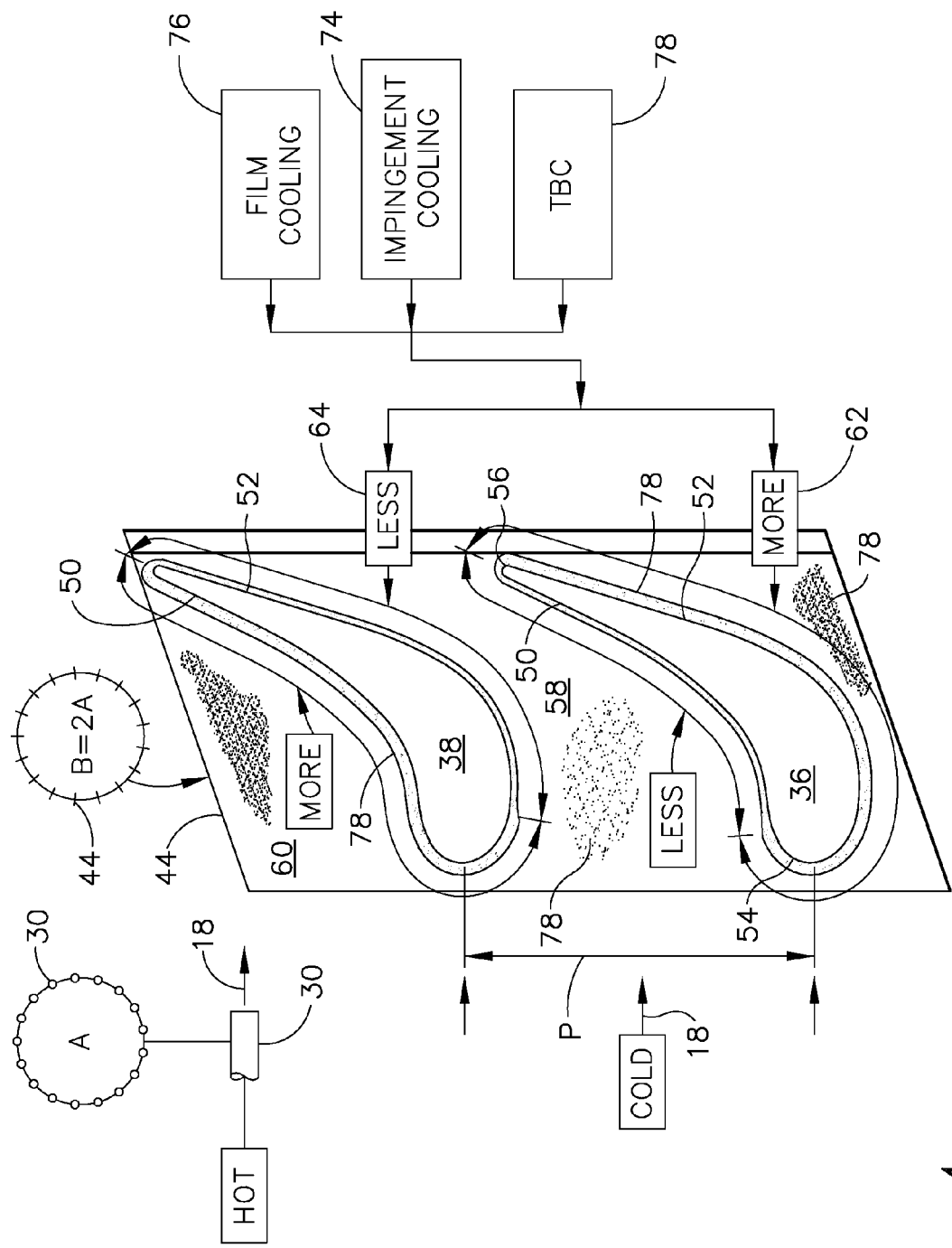
FIG. 4 is a schematic representation of the combustor and turbine illustrated in FIG. 2 including the different configurations of cooling circuits cooperating therewith.

FIG. 4 illustrates schematically the various preferred modifications of the different first and second cooling circuits 62,64 for the two forms of vanes 36,38. Since vane cooling is effected by various mechanisms, those various mechanisms may be modified to effect the desired differences for complementing the hot and cold streaks which vary repetitively around the circumference of the combustor as discharged around the circumference of the annular turbine nozzle.

The two cooling circuits 62,64 may be configured for effecting different film cooling configurations in the two vanes 36,38 in each nozzle doublet.

The two circuits 62,64 may also be modified for effecting different impingement cooling in the two vanes 36,38.

And, the two cooling circuits 62,64 may also be modified for effecting different thermal barrier coatings 78 on the opposite sides of the two vanes 36,38.

FIGS. 2 and 3 illustrate exemplary configurations of the different cooling circuits 62,64 which correspond with the schematic representation thereof found in FIG. 4.

The first and second cooling circuits 62,64 may be suitably configured to effect reciprocal film cooling on the vane pressure and suction sides 50,52 for greater or more cooling along the outboard vane sides facing the outboard passages 60 than along the inboard vane sides facing the inboard passages 58.

In one configuration, the patterns of film cooling holes 76 through the opposite pressure and suction sides 50,52 of the first and second vanes 36,38 may be preferentially different for discharging more cooling air through the outboard vane sides 50,52 than through the inboard sides 50,52.

In FIG. 2, the outboard sides of the vanes have a greater density or number of film cooling holes 76 per unit area than found on the corresponding inboard sides. Note that the outboard suction side 52 of the first vane 36 has more rows of the film cooling holes 76 than the inboard suction side 52 of the second vane 38.

Correspondingly, the outboard pressure side 50 of the second vane 38 has a greater density and more rows of the film cooling holes 76 than the inboard pressure side 50 of the first vane 36.

Separately or in conjunction with the different density of film cooling holes, the size or diameter of the film cooling holes 76 may be larger on the outboard sides of the vanes 36,38 than the inboard sides thereof. Typical film cooling holes have a nominal diameter of about 15-20 mils (0.38-0.51 mm) and are typically one size in a conventional design. But, both large and small film cooling holes may now be selectively used in the nozzle, so that the larger film cooling holes may be at the upper end of this range whereas the smaller film cooling holes may be at the lower end of this range.

The film cooling holes in this configuration may be suitably dispersed over the opposite pressure and suction sides of each vane 36,38 to provide enhanced cooling directly around the leading edge of each vane, as well as with preferentially more cooling along the outboard surfaces than the inboard surfaces. Since the hot streaks are specifically clocked circumferentially to flow solely through the outboard flow passages 60, enhanced film cooling may be used on the vane sides bounding the outboard flow passages 60.

Correspondingly, since the cold streaks are specifically clocked circumferentially to flow through the inboard flow passages 58, less cooling is required from the inboard surfaces of the two vanes 36,38 and the configuration of the film cooling holes thereat may be suitably adjusted.

For a given amount of pressurized cooling flow bled from the compressor, the flow may be redistributed preferentially more to the outboard surfaces than to the inboard surfaces of the vanes 36,38 to preferentially match the different heat loads from the hot and cold streaks. The limited amount of cooling air is therefore more efficiently utilized and reduces differential temperatures in the different components of the turbine nozzle.

Either the nozzle may be more effectively cooled using the given amount of air bled from the compressor, or the amount of air bled from the compressor may be reduced in view of the preferential cooling of vanes.

Each nozzle vane 36,38 is no longer identical to each other in physical configuration and cooling configuration, but now includes different configurations of conventional components to specifically address the different heat loads from the hot and cold streaks. Overcooling of certain portions of the nozzle vane due to conventional practice may now be substantially reduced, and the limited amount of air better utilized to specifically address the repetitive locations of the hot streaks no longer random around the circumference of the turbine nozzle.

The first and second cooling circuits 62,64 may be alternatively modified in FIGS. 2 and 3 to effect reciprocal impingement cooling on the vane pressure and suction sides 50,52 for greater or more impingement cooling along the outboard passages 60 than along the inboard passages 58.

Each of the two vanes 36,38 may have physically identical forward impingement baffles 66,70, and physically identical aft impingement baffles 68,72 having respective patterns of the impingement holes 74 differently configured for the desired different performance. The impingement holes in the several baffles face the corresponding inner surfaces of the pressure and suction sides 50,52 of each of the vanes 36,38, with the patterns being suitably different for discharging more impingement cooling air flow through the baffles against the outboard sides 50,52 of the vanes than against the corresponding inboard sides thereof.

In particular, the outboard sides of the impingement baffles may have a suitably greater density, or number per unit area, of the impingement holes 74 than the corresponding inboard sides thereof. In FIG. 2, the outboard sides of the impingement baffles inside the suction side 52 of the first vane 36 have a greater density of impingement holes than the inboard side of the baffles inside the second vane 38 along the suction side 52.

Correspondingly, the outboard sides of the baffles in the second vane 38 along the pressure side 50 have a greater density of the impingement holes than the inboard sides of the baffles in the first vane 36 along the pressure side 50.

The impingement baffles have suitable patterns of impingement holes therein for maximizing cooling effectiveness behind the leading edges of the vanes 36,38 subject to locally high heat loads from the incident combustion gases. And, the patterns of impingement holes may be adjusted to provide greater impingement cooling from the leading edges 54 to the trailing edges 56 along the outboard sides 52,50 of the first and second vanes 36,38 than along the corresponding inboard sides thereof.

Yet again the limited cooling air is redistributed in the vane pairs to utilize more impingement cooling along the outboard sides of the vanes subject to the hot streaks than along the inboard sides of the vanes subject to the cold streaks.

As indicated above, the exposed surfaces of the turbine nozzle are typically covered with the TBC 78. Accordingly, the first and second cooling circuits 62,64 may be modified to include reciprocal degrees, or effective amounts, of the TBC 78 on the vane pressure and suction sides 50,52 for effecting more or greater thermal insulation and cooling along the outboard passages 60 than along the inboard passage 58.

The thermal barrier coating 78 provides substantial thermal insulation against the heat loads of the combustion gas and complements the cooling effectiveness of each vane. The thickness of the TBC 78 may be suitably varied to vary its thermal insulating effect and effective cooling capability to preferentially protect and cool the outboard sides of the vanes 36,38 relative to the inboard sides thereof.

FIG. 4 illustrates schematically an exemplary configuration of the TBC 78 having different thickness around the opposite sides of the two vanes 36,38 in each nozzle doublet. For example, the TBC 78 may be relatively thick and uniform along the outboard suction side 52 of the first vane 36 from the leading edge 54 to the trailing edge 56, and similarly uniform and thick along the outboard pressure side 50 of the second vane 38 from the leading edge to trailing edge thereof.

Correspondingly, the TBC 78 may be relatively uniform and thin along the inboard pressure side 50 of the first vane 36 between the leading and trailing edges, and similarly uniform and thin along the suction side 52 of the second vane 38 between the leading and trailing edges.

The thick TBC 78 may be about 15-20 mils (0.38-0.51 mm) which is slightly thicker than conventionally applied TBC. The relatively thin TBC may be about 5-10 mils (0.13-0.25 mm) thick.

By specifically aligning circumferentially or clocking the fuel injectors 30 with the nozzle vanes, the relative locations of the hot and cold streaks may be fixed in space, and no longer random or variable, which permits preferential cooling of the nozzle vanes with differences therebetween not previously possible.

In the exemplary embodiments disclosed above, two different configurations of the vanes 36,38 are used and alternated repetitively in the full row of vanes and arranged in the preferred pairs. FIG. 4 illustrates schematically a specific number A, 17 for example, of the fuel injectors 30 spaced uniformly around the circumference of the combustor.

Correspondingly, the number of doublet segments with the corresponding pairs of vanes 36,38 and outer and inner band segments 40,42 equally matches the number of fuel injectors in the row.

Accordingly, the total number B, 34 for example, of the two types of vanes 36,38 in the complete turbine nozzle is exactly equal to twice the number A (2×17) of the fuel injectors 30 around the combustor.

FIGS. 2 and 4 illustrate schematically that with the twice multiple number of vanes 36,38 compared with the fuel injectors 30, the circumferential position or clocking of the fuel injectors 30 may now be fixed at exact, repeating locations between the nozzle vanes.

In a preferred embodiment, the fuel injectors 30 are circumferentially clocked midway between the first and second vanes 36,38 of adjoining nozzle doublets in axial alignment with corresponding outboard flow passages 60 which contain the axial splitlines 44. The fuel injectors are therefore clocked with the axial splitlines to particular advantage.

Firstly, some of the cooling air for the turbine nozzle leaks around the spline seals 48 along the splitlines 44 and helps dilute the hot streaks of combustion gases channeled through the outboard flow passages 60.

Considerably thicker TBC 78 may be applied more effectively without obstruction over the outboard surfaces of the two vanes 36,38 than along the inboard surfaces. The thicker TBC along the outboard surfaces provides enhanced thermal protection against the hot streaks channeled through the outboard passages.

Furthermore, both the film cooling and impingement cooling configurations of the two cooling circuits 62,64 may also be modified as described above to effect reciprocal cooling and bias more cooling along the outboard surfaces of the vanes than along the inboard surfaces of the vanes and correspondingly match the different heat loads from the hot and cold streaks.

The exemplary vanes 36,38 illustrated in FIG. 4 have a substantially uniform circumferential pitch spacing P around the circumference of the turbine nozzle. The fuel injectors 30 may be clocked midway between adjoining nozzle doublets, while the intervening cold streaks may be correspondingly clocked midway between the two vanes 36,38 in each doublet.

Accordingly, the cold streaks are confined to flow solely through the inboard flow passages 58, with the hot streaks being confined to flow solely through the outboard flow passages 60. And, the different cooling performance of the first and second circuits 62,64 may be effectively used to provide more cooling over the outboard flow passages which confine the hot streaks, with less cooling around the inboard flow passages 58 which confine the cold streaks.

Furthermore, when the hot and cold streaks approach the downstream turbine blades 22 illustrated in FIG. 2, the cold streaks locally accumulate on the blade convex surface while the hot streaks locally accumulate on the blade concave surface due to the density differences of the hot and cold streaks. This phenomena has been observed in computational analysis and in used engine hardware, and adversely affects aerodynamic performance of the turbine blades.

However, the preferential cooling of the outboard flow passages over the inboard flow passages discharges the spent cooling air differently around the hot and cold streaks, and increases dilution of the hot streaks to correspondingly reduce the variation in temperature between the hot and cold streaks as they are discharged downstream into the row of turbine blade.

The reduction in circumferential variation of the combustion gas temperature reduces the local accumulation of the hot and cold streaks on the corresponding sides of the turbine rotor blades and improves aerodynamic performance thereof.

More specifically, the row of first stage turbine blades 22 directly follows the turbine nozzle, and each turbine blade is hollow, with a conventional cooling circuit therein as shown in FIGS. 1 and 2. Pressurized air is bled from the compressor and channeled through the blades for discharge in various rows of conventional film cooling holes in the sides thereof.

During operation of the engine, the film cooling holes 76 in the upstream nozzle vanes 36,38 discharge the spent cooling air through the outboard flow passages 60 and thereby effect dilution cooling of the hot streaks from the combustor 16 which flow downstream to the turbine blades 22.

Since the hot streaks are therefore cooler, the heat loads on the turbine blades are therefore reduced. The cooling requirements for the first stage turbine blades are then reduced, and either the blade cooling flow may be reduced for further increases in engine performance and efficiency, or the cooling flow may remain the same for greater blade cooling and increased blade life.

Yet further, excess cooling air may be channeled through the vanes 36,38 in an amount greater or more than required for normal cooling thereof against the expected heat loads.

This, in turn, will cause the excess vane cooling air to be discharged into the outboard flow passages 60 to further increase dilution of the hot streaks. This excess vane cooling occurs upstream from the nozzle throat of minimum flow area at the vane trailing edge normal to the next adjacent suction side. The excess vane air is non-chargeable to the operating cycle and does not degrade performance.

Correspondingly, further reduction in cooling air flow to the turbine blades may be effected so that the increased vane flow occurs simultaneously with the decreased blade flow. The blade cooling flow is chargeable to the operating cycle, and its reduction improves engine performance.

Since the hot streaks continue downstream from the combustor through the various turbine stages, the benefits in operation and performance from the selective dilution thereof are compounded in the downstream stages of nozzle vanes and turbine blades which have internal cooling circuits, as well as in surrounding turbine blade shrouds.

Accordingly, the ability to selectively cool the first stage nozzle vanes has compound benefits in the vanes themselves, as well as in their cooperation with the downstream turbine blades, and following turbine stages.

The preferential cooling of the different vanes in each nozzle segment therefore enjoys many advantages in cooling performance, aerodynamic performance, and thermal stress. The limited amount of cooling air is better matched to the different heat loads from the hot and cold streaks for enhancing cooling performance and reducing differential temperatures in the vane components. Thermal stress is reduced, and blade life may therefore be increased.

The preferentially cooled turbine nozzle disclosed above may be used for further reducing the total flow of cooling air to the nozzle if desired; or maintaining a given amount of cooling air; or even increasing the total coolant flowrate to preferentially increase dilution of the hot streaks carried aft to the following stages. The various benefits of this preferential cooling include enhanced cooling, engine performance, and component life.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine apparatus comprising:
   a turbine nozzle including a row of alternating first and second vanes arranged in pairs radially between outer and inner bands having axial splitlines therebetween; and
   said first and second vanes having different first and second cooling circuits for cooling less sides thereof bounding inboard flow passages devoid of said splitlines between said first and second vanes than outboard flow passages including said splitlines.

2. An apparatus according to claim 1 wherein said first and second cooling circuits effect reciprocally more cooling on outboard sides of said vane pairs than on inboard sides thereof.

3. An apparatus according to claim 2 wherein said first and second cooling circuits effect more cooling along said outboard sides from leading edges of said vanes to trailing edges thereof than along said inboard sides between said leading and trailing edges.

4. An apparatus according to claim 3 wherein said first and second cooling circuits comprise different film cooling configurations.

5. An apparatus according to claim 4 wherein said first and second cooling circuits comprise patterns of film cooling holes greater in density through said outboard sides than through said inboard sides.

6. An apparatus according to claim 3 wherein said first and second cooling circuits comprise different impingement cooling configurations.

7. An apparatus according to claim 6 wherein said first and second cooling circuits comprise impingement baffles inside said vanes having patterns of impingement holes greater in density facing inner surfaces of said outboard sides than said inboard sides.

8. An apparatus according to claim 3 wherein said first and second cooling circuits comprise different thermal barrier coatings on said outboard and inboard sides.

9. An apparatus according to claim 3 further comprising:
an annular combustor disposed upstream from said vanes; and
said combustor includes a row of fuel injectors respectively clocked with said outboard flow passages.

10. An apparatus according to claim 9 wherein said row of vanes is twice in number than said row of fuel injectors, and said injectors are clocked with said splitlines.

11. A turbine nozzle comprising:
first and second hollow vanes integrally joined to outer and inner bands having opposite first and second endfaces;
each of said vanes having opposite pressure and suction sides extending axially in chord between opposite leading and trailing edges, with the suction side of said first vane adjoining said first endface, and the pressure side of said second vane adjoining said second endface, and said first and second vanes have respective first and second cooling circuits for preferentially cooling said vane sides;
said first cooling circuit being configured to provide more cooling over said suction side of said first vane than said second cooling circuit provides over said suction side of said second vane; and
said second cooling circuit being configured to provide more cooling over said pressure side of said second vane than said first cooling circuit provides over said pressure side of said first vane.

12. A nozzle according to claim 11 wherein:
said pressure and suction sides of said first and second vanes, respectively, face inboard toward each other to define an inboard flow passage between said vanes for channeling combustion gases; and
said suction and pressure sides of said first and second vanes, respectively, face outboard toward respective endfaces to define corresponding outboard flow passages for channeling combustion gases.

13. A nozzle according to claim 12 wherein said first and second cooling circuits effect reciprocal film cooling on said vane pressure and suction sides for more cooling along said outboard passages than along said inboard passage.

14. A nozzle according to claim 13 wherein said first and second cooling circuits include patterns of film cooling holes through said pressure and suction sides for discharging more cooling air through said outboard sides than through said inboard sides.

15. A nozzle according to claim 14 wherein said outboard sides have a greater density of said film cooling holes than corresponding inboard sides.

16. A nozzle according to claim 14 wherein said outboard sides have larger film cooling holes than said inboard sides.

17. A nozzle according to claim 12 wherein said first and second cooling circuits effect reciprocal impingement cooling on said vane pressure and suction sides for more cooling along said outboard passages than along said inboard passage.

18. A nozzle according to claim 17 wherein said first and second cooling circuits include impingement baffles inside said vanes having patterns of impingement holes facing inner surfaces of said pressure and suction sides for discharging more cooling air flow against said outboard sides than said inboard sides.

19. A nozzle according to claim 18 wherein said impingement baffles have a greater density of said impingement holes along outboard sides than along corresponding inboard sides.

20. A nozzle according to claim 12 wherein said first and second cooling circuits effect reciprocal degrees of thermal barrier coating on said vane pressure and suction sides for more cooling along said outboard passages than along said inboard passage.

21. A nozzle according to claim 20 wherein said thermal barrier coating on said outboard sides is thicker than said thermal barrier coating on said inboard sides.

22. A nozzle according to claim 12 in combination with an annular combustor disposed upstream from said vanes; and
said combustor includes a row of fuel injectors respectively clocked with said outboard flow passages.

23. A nozzle combination according to claim 22 wherein said vanes are arranged in pairs in a number of doublet segments with said bands matching the number of said fuel injectors in said row.

24. A nozzle combination according to claim 23 wherein the number of said vanes is twice said number of said fuel injectors.

25. A nozzle combination according to claim 24 wherein said fuel injectors are clocked midway between said first and second vanes of adjacent doublets in axial alignment with corresponding outboard flow passages.

26. A gas turbine engine apparatus comprising:
an annular combustor including a row of fuel injectors;
a turbine nozzle including a row of alternating first and second vanes arranged in pairs radially between outer and inner bands having axial splitlines therebetween;
said row of vanes being twice in number than said row of fuel injectors; and
said first and second vanes having different first and second cooling circuits for differently cooling sides thereof bounding inboard flow passages between said first and second vanes than outboard flow passages including said splitlines.

27. An apparatus according to claim 26 wherein said first and second cooling circuits effect reciprocal cooling on outboard sides of said vanes than on inboard sides of said vanes.

28. An apparatus according to claim 27 wherein said first and second cooling circuits effect more cooling along said outboard sides than along said inboard sides.

29. An apparatus according to claim 28 wherein said first and second cooling circuits effect more cooling along said outboard sides from leading edges of said vanes to trailing edges thereof than along said inboard sides between said leading and trailing edges.

30. An apparatus according to claim 29 wherein said first and second cooling circuits comprise different film cooling configurations.

31. An apparatus according to claim 29 wherein said first and second cooling circuits comprise different impingement cooling configurations.

32. An apparatus according to claim 29 wherein said first and second cooling circuits comprise different thermal barrier coatings on said outboard and inboard sides.

33. An apparatus according to claim 28 further comprising:
a row of turbine blades following said turbine nozzle; and
wherein said first and second cooling circuits include film cooling holes through said vane sides to discharge spent cooling air therethrough and effect dilution of combustion gas hot streaks from said combustor and through said outboard flow passages to said blades.

34. A method of operating said gas turbine engine apparatus according to claim 33 comprising:
discharging combustion gas hot streaks from said combustor and through said outboard flow passages to said turbine blades; and
discharging spent cooling air from said vanes and through said outboard flow passages to dilute said hot streaks.

35. A method according to claim 34 further comprising:
channeling through said vanes excess cooling air more than required for cooling thereof; and
discharging said excess cooling air through said vanes into said outboard flow passages to increase dilution of said hot streaks.

36. A method according to claim 35 further comprising increasing said cooling air flow to said nozzle vanes to dilute said hot streaks while decreasing cooling air flow to said turbine blades.

* * * * *